US012221525B1

United States Patent
Lester et al.

(10) Patent No.: US 12,221,525 B1
(45) Date of Patent: Feb. 11, 2025

(54) FORMALDEHYDE-FREE CYCLIC UREA REACTIVE ADDITIVES FOR EXOTHERM SUPPRESSANT COMPOSITIONS

(71) Applicant: JOHNS MANVILLE, Denver, CO (US)

(72) Inventors: Uranchimeg Lester, Littleton, CO (US); Ameya Natu, Highlands Ranch, CO (US); Kiarash Alavi, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/670,722

(22) Filed: Feb. 14, 2022

(51) Int. Cl.
| | |
|---|---|
| *C08K 5/3447* | (2006.01) |
| *C08G 63/16* | (2006.01) |
| *C08J 5/24* | (2006.01) |
| *C09K 21/10* | (2006.01) |

(52) U.S. Cl.
CPC ............ *C08K 5/3447* (2013.01); *C08G 63/16* (2013.01); *C08J 5/244* (2021.05); *C08J 5/249* (2021.05); *C09K 21/10* (2013.01); *C08J 2367/02* (2013.01)

(58) Field of Classification Search
CPC ......... C08K 5/3447; C08J 5/249; C08J 5/244; C08J 2367/02; C08G 63/16; C09K 21/10
USPC ....................................................... 523/222
See application file for complete search history.

(56) References Cited

U.S. PATENT DOCUMENTS

| | | | | |
|---|---|---|---|---|
| 2009/0007340 | A1* | 1/2009 | Obernyer | A47C 31/001 5/698 |
| 2014/0134497 | A1* | 5/2014 | Lester | C08L 1/02 106/145.4 |
| 2015/0232645 | A1* | 8/2015 | Alavi | C08K 7/14 536/53 |

FOREIGN PATENT DOCUMENTS

| | | | | |
|---|---|---|---|---|
| CN | 101817825 A | * | 9/2010 | ........... C07D 487/08 |
| JP | 2002105336 A | * | 4/2002 | ........... C08L 101/00 |
| JP | 2021187982 A | * | 12/2021 | ............ C08G 59/00 |

OTHER PUBLICATIONS

Harashina et al., JP 2002-105336 A machine translation in English, Apr. 10, 2002 (Year: 2002).*
Nishikawa, JP 2021-187982 A, machine translation in English, Dec. 13, 2021. (Year: 2021).*
Liu et al., CN 101817825 A machine translation in English, Sep. 1, 2010. (Year: 2010).*

* cited by examiner

Primary Examiner — David T Karst
(74) Attorney, Agent, or Firm — Robert D. Touslee

(57) ABSTRACT

Exotherm suppressant compositions are described that include a resin, such as a thermoset or thermoplastic resin, and at least one cyclic urea compound. Such compositions have no free formaldehyde, contain no antimony and are halogen free, for example. As described, such compositions can be used as binders, for example, to bind organic, inorganic fibers, and/or minerals. Also described are binder-containing fiberglass products that include glass fibers and a binder. The binder-containing fiberglass products have reduced formaldehyde emissions.

20 Claims, 8 Drawing Sheets

FORMALDEHYDE-FREE CYCLIC UREA REACTIVE ADDITIVES FOR EXOTHERM SUPPRESSANT COMPOSITIONS

TECHNICAL FIELD

The present technology relates to exotherm suppressant compositions that comprise resins, such as a thermoset or thermoplastic resin, and a cyclic urea compound. Such compositions have no free formaldehyde. Such compositions can be used as binders, for example, to bind inorganic and organic fibers and minerals.

BACKGROUND

Organic polymers are used to bind organic substrates like polyester spunbond substrates and also to bind inorganic fibers and minerals to manufacture composites, reinforcement mats, insulation (e.g., building, industrial, and pipe) and in other applications. Many of these articles are exposed to high temperatures. For example, mineral or glass fiber pipe insulation contains roughly 2-7% organic binder and is exposed to temperatures up to 450° C. in some applications. Most organic binders used in manufacturing of pipe insulation pyrolyze at around 250° C., generate volatile organic compounds that spontaneously catch fire. Fiber glass boards utilized for thermal and sound insulation such as marine hull board application contain roughly 12-20% organic binder. In case of exposure to high heat or fire, the boards should resist rapid exothermic decomposition and do not sustain fire.

Formaldehyde containing resins such as phenol formaldehyde ("PF") and melamine formaldehyde ("MF") resins and combination of the two have been utilized for exotherm resistant binders in many applications. PF is generally pre-reacted with urea to reduce the cost to form a phenol urea formaldehyde intermediate resin. Depending on the level of free formaldehyde in the patent PF resin. 15-35% urea can be utilized, for example. The added urea does not improve the exotherm and fire resistance of PF significantly. As a result. MF, halogenated or phosphate fire retardants are often utilized. MF has short shelf life, releases formaldehyde and alcohol during cure and cannot be used in formaldehyde-free or reduced formaldehyde emitting applications. Health hazards associated with halogenated exotherm suppressants/fire retardants greatly limit their application They are generally used in combination with antimony compounds which also add to the hazardous nature of these fire retardants. Phosphate fire retardants have limited compatibility with various binders and have limited activity, particularly in very thin films that bind glass fibers together in a fiber glass insulation.

In order to reduce the formaldehyde emission problem with these binders, various solutions have been tried, including increasing the ratio of phenol relative to formaldehyde (e.g., making novolac PF binders), and adding "formaldehyde scavengers" to the binder compositions. Conventional formaldehyde scavengers add cost and reduce binder performance, especially when the scavenger is required to make up a large fraction of the binder composition and serves no other purpose besides formaldehyde scavenging. For example, bisulfite salts are known formaldehyde scavengers, but otherwise contribute little to binder performance as a crosslinking agent or curing catalyst. Binders that are loaded with these salts are also more hydrophilic, which degrades their performance in hot, humid environments. Unfortunately, phenol is much less soluble in water than formaldehyde, so increasing the relative amount of phenol in the binder composition reduces its solubility in water. Alternative organic solvents that more readily dissolve phenol are not commercially practical, or environmentally advisable, in binder compositions for fiberglass insulation products. Certain urea/formaldehyde additives have been utilized but can generate formaldehyde during cure of the binder and cannot be utilized in formaldehyde-free or low formaldehyde emitting applications. They also decompose at relatively low temperatures which limits their utility as exotherm suppressants.

Certain polymers such as aromatic epoxies, polyurethanes and polyamides are inherently fire resistant. However, for many of their applications they require addition of exotherm/fire retardants. Typically halogenated or phosphate-based fire retardants are added with the above mentioned limitations. Another limitation with most exotherm suppressants is that if they do not participate in the curing reaction with the binder, they can migrate within or out of the polymeric matrix Over time, the concentration of fire retardant in the binder matrix will change, resulting in reduction in exotherm resistance of the binder.

Formaldehyde-containing polymers have been used as binders in composite materials since the start of the plastics industry. Unfortunately, many formaldehyde-containing binders release free formaldehyde both during curing of the binder composition and from the products containing the cured binder. Thus, there is a need to develop formulations and methods that reduce the release of formaldehyde from binders that include formaldehyde-containing polymers.

BRIEF SUMMARY

The present disclosure includes exotherm suppressant compositions that include at least one thermoset or thermoplastic resin, a cyclic urea compound which can optionally be incorporated in the polymeric matrix of the thermoset or thermoplastic resin, and that have no free formaldehyde.

In some embodiments, the cyclic urea compound has the formula:

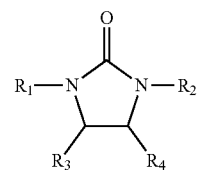

wherein $R_1$ and $R_2$ are independently selected from a hydrogen, a hydroxyl group, an alcohol group, and an alkyl group, and wherein $R_3$ and $R_4$ are independently selected from a hydroxyl group, an alcohol group, and an alkyl group. For example, the cyclic urea compound can be 4,5-dihydroxyimidazolidin-2-one ("DHEU"). The cyclic urea can also have the formula:

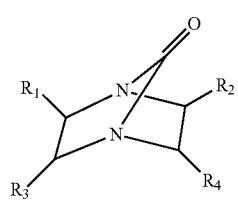

wherein $R_1$, $R_2$, $R_3$, and $R_4$ are independently selected from a hydroxyl group, an alcohol group, and an alkyl group, for example. In other embodiments, the cyclic urea compound has the formula:

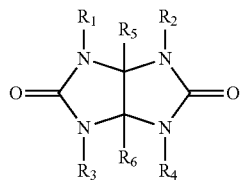

wherein $R_1$, $R_2$, $R_3$, and $R_4$ are independently selected from a hydrogen, a hydroxyl group, an alcohol group, and an alkyl group, and wherein $R_5$ and $R_6$ are independently selected from a hydroxyl group, an alcohol group, and an alkyl group. In some aspects, the exotherm suppressant compositions can be halogen-free, antimony-free, or both.

In some embodiments, the thermoset or thermoplastic resin is selected from the group consisting of epoxies, polyurethanes, acrylics, polyolefins, polyacrylics, polystyrenes, polyesters, and latex and dispersion polymers. For example, in some aspects, the thermoset or thermoplastic resin is selected from the group consisting of phenol formaldehyde, urea formaldehyde, phenol-urea-formaldehyde, melamine formaldehyde, melamine-urea-formaldehyde, resorcinol-formaldehyde, and polyesters (e.g., a polyacrylic acid/polyol resin).

In some aspects, the disclosed exothermic suppressant compositions are water soluble, organic soluble, or both. In some aspects, the cyclic urea is present in an about from 1 wt. % to 50 wt. % (e.g., from 10 wt. % to 40 wt. % or from 15 wt. % to 35 wt. %) based on the weight of the exotherm suppressant composition. For the disclosed exotherm suppressant compositions, in some aspects, the mass retention of the composition at 600° C. measured using thermogravimetric analysis is 15% or greater, based on the total mass of the exotherm suppressant composition.

Other embodiments of the disclosure involve fiberglass insulation composition, comprising glass fibers and a binder, wherein the binder comprises a thermoset or thermoplastic resin and a cyclic urea compound, such as those discussed, wherein the composition has no free formaldehyde. In some embodiments, the time to flame out for these fiberglass insulation composition as measured by ASTM E-1354 is 80 seconds or less.

With respect to making the disclosed products, some embodiments of the disclosure involve methods of making a fiberglass insulation product, the method comprising forming a binder composition comprising a thermoset or thermoplastic resin and a cyclic urea compound such as those discussed; contacting the binder composition with glass fibers to form an amalgam of the binder composition and glass fibers; heating the amalgam of the binder composition and the glass fibers to form a mat of glass fibers and binder; and processing the mat of glass fibers and binder into the fiberglass insulation product; wherein the binder composition is formaldehyde free.

BRIEF DESCRIPTION OF THE DRAWINGS

A further understanding of the nature and advantages of the disclosed technology may be realized by reference to the remaining portions of the specification and the drawings.

Figure 1A:
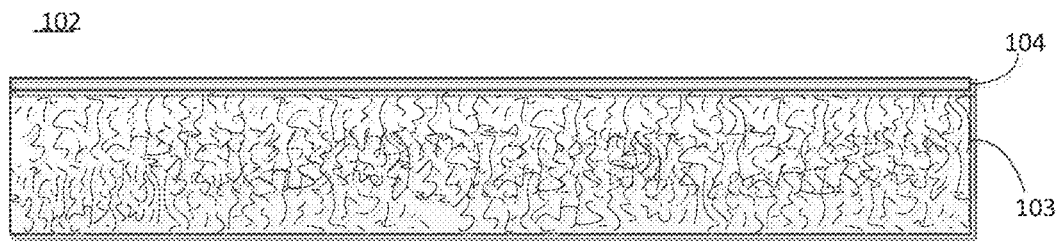
FIGS. 1A-C show simplified illustrations of exemplary composite materials according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

The present disclosure relates to providing formaldehyde-free, low cost, safe, water and organic soluble, halogen and antimony-free reactive exotherm suppressants that can be utilized with thermoset and thermoplastic resins, for example. Embodiments disclosed herein can possess some or all of these features. Embodiments can include certain cyclic ureas that can help achieve some or all of these features.

Exotherm suppressants as described herein can be used in binder compositions, for example, that can make a variety of composite materials that include the cured binder and a reinforcement material such as glass fibers. Some examples of these composite materials include binder-coated fiberglass products for thermal insulation, facers, and reinforcement scrims, among other uses. Among other benefits, the binders can have good mechanical properties and exceptional thermal stability. Their thermal stability makes them well suited in fiberglass insulation products placed in high-temperature environments like around hot pipes and ducts, and incorporated into articles designed for heating such as ovens and dishwashers, among other high-temperature uses.

Many binder compositions containing formaldehyde release free-formaldehyde while the compositions are curing, and the cured products can continue to release formaldehyde for an extended period. High levels of formaldehyde emitted from the curing compositions is an irritant, and many jurisdictions have set emission limits on the levels of formaldehyde released from the cured products. In some cases, the rate of formaldehyde emissions can increase when the temperature of the composite product increases. In some instances, the increase in formaldehyde emissions caused by the increased temperature can approach the regulated emissions limits for the product. Thus, there is a need for new binder composition formulations that have reduced levels of free formaldehyde and produce reduced formaldehyde emissions during curing operations and from the binder-containing products.

Embodiments of the present disclosure address problems with formaldehyde emissions from binder compositions and binder-containing products. In embodiments, the compositions may include exotherm suppressants including at least one cyclic urea compound, for example, 4,5-dihydroxyimidazolidin-2-one. The disclosed binders can be characterized by a reduction in formaldehyde emissions that are greater than conventional binder compositions. Additional details about embodiments of the exotherm suppressants and binder compositions are discussed below.

Exemplary Exotherm Suppressants

Embodiments of the present exotherm suppressant composition include at least one cyclic urea compound. The basic structures of exemplarity cyclic ureas are shown below. In addition to the basic structures, all derivatives (e.g., substituted functional groups and/or substituents) and/or analogs can be included. In some embodiments the cyclic urea compound has the formula:

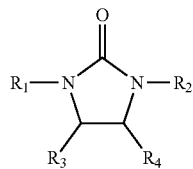

wherein $R_1$ and $R_2$ are independently selected from a hydrogen, a hydroxyl group, and an alcohol group, and wherein $R_3$ and $R_4$ are independently selected from a hydroxyl group and an alcohol group.

In some embodiments, the cyclic urea compound has the formula:

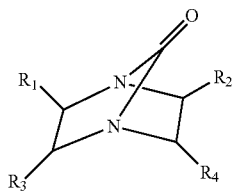

wherein $R_1$, $R_2$, $R_3$, and $R_4$ are independently selected from a hydroxyl group and an alcohol group.

In some embodiments, the cyclic urea compound has the formula:

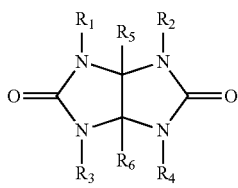

wherein $R_1$, $R_2$, $R_3$, and $R_4$ are independently selected from a hydrogen, a hydroxyl group and an alcohol group, and wherein $R_5$ and $R_6$ are independently selected from a hydroxyl group and an alcohol group.

Examples of cyclic urea compounds include, but are not limited to, 4,5-dihydroxyimidazolidin-2-one.

Other functional groups can be added to these cyclic ureas, for example, via reaction with the —NH and/or —OH groups of these compounds.

In embodiments, the cyclic urea compounds described may be formed as reaction products of (i) a urea compound with (ii) an aldehyde and/or ketone containing compound. In one example, the urea compound may be a substituted our unsubstituted urea having the Formula (I):

where $R_1$, $R_2$, $R_3$, and $R_4$ are independently chosen from a hydrogen moiety (H), an alkyl group, an aromatic group, an alcohol group, an aldehyde group, a ketone group, a carboxylic acid group, and an alkoxy group. Exemplary alkyl groups include straight-chained, branched, or cyclic hydrocarbons of varying size (e.g., $C_1$-$C_{12}$, $C_1$-$C_8$, $C_1$-$C_4$, etc.). Exemplary aromatic (i.e., aryl) groups include substituted or unsubstituted phenyl moieties, among other aromatic constituents. Exemplary alcohol groups include-ROH, where R may be a substituted or unsubstituted, saturated or unsaturated, branched or unbranched, cyclic or acyclic, organic moiety. For example, R may be —$(CH_2)_n$—, where n may be 1 to 12. Exemplary alcohols may also include polyols having two or more hydroxyl groups (—OH) in alcohol group. Exemplary aldehyde groups include-RC(=O) H, where R may be a monovalent functional group (e.g., a single bond), or a substituted or unsubstituted, saturated or unsaturated, branched or unbranched, cyclic or acyclic, organic moiety, such as —$(CH_2)_n$—, where n may be 1 to 12. Exemplary ketone groups may include —RC(=O)R' where R and R' can be variety of carbon containing constituents. Exemplary carboxylic acid groups may include —R—COOH, where R may be a monovalent functional group, such as a single bond, or a variety of carbon-containing constituents. Exemplary alkoxy groups include —$OR_x$, where $R_x$ is an alkyl group.

In embodiments, the aldehyde reactant may include dialdehyde and/or diketone containing compounds may include polyaldehydes (e.g., dialdehydes), polyketones (e.g., diketones), and compounds that have at least two aldehyde groups or at least two ketone groups. Examples include α,β-bicarbonyl compounds where carbonyl carbons are directly bonded as illustrated in the following Formula (II):

where $R_5$ and $R_5$ are independently chosen from a hydrogen moiety (H), an alkyl group, or an aromatic group. Exemplary α,β-carbonyl compounds include glyoxal, diacetyl, and benzil (i.e., 1,2-diphenylethane-1,2-dione).

Examples further include α,γ-bicarbonyl compounds where the carbonyl carbons are separated by one carbon atom as illustrated in the following Formula (III):

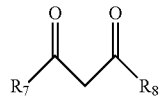
(III)

wherein $R_7$ and $R_8$ are independently chosen from a hydrogen moiety (H), an alkyl group, or an aromatic group. Exemplary α,γ-bicarbonyl compounds include malondialdehyde, and acetylacetone. In some instances, the $R_7$ and $R_8$ groups may independently also include alkoxide groups (—OR) where R represents an alkyl group, and amine groups (—NR'R"), where R' and R" independently represent a hydrogen moiety (H) or an alkyl group. For example, the α,γ-bicarbonyl compounds may include malonic acid esters having Formula (IV):

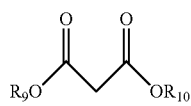
(IV)

where $R_9$ and $R_{10}$ are independently an alkyl group or an aromatic group.

Additional examples of α,γ-bicarbonyl compounds may include those with amide moieties such as those illustrated in Formula (V):

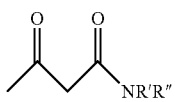
(V)

where R' and R" are independently a hydrogen moiety (H) or an alkyl group.

Additional examples of α,γ-bicarbonyl compounds may further include those with alkoxy moieties such as those illustrated in Formula (VI):

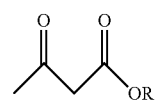
(VI)

where R represents an alkyl group.

Exemplary aldehyde and/or ketone containing compounds may include aldehyde-containing compounds having one or more (e.g., two or more) aldehyde functional groups. Examples of these aldehyde-containing compounds include acetaldehyde, propionaldehyde, butyraldehyde, acrolein, furfural, glyoxal, glutaraldehyde, and polyfurfural among others. Exemplary aldehyde-containing compounds may also include substituted glyoxal compounds having Formula (VII):

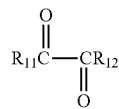
(VII)

where $R_{11}$ and $R_{12}$ may be independently hydrogen (H), an alkyl group, an aromatic group, an alcohol group, an aldehyde group, a ketone group, a carboxylic acid group, and an alkoxy group, among other groups.

The reaction products of the urea compound and the aldehyde and/or ketone containing compound depend on the types of compounds selected, as well as the mole ratio of each compound. For example, when the urea compound is urea and the aldehyde and/or ketone containing compound is glyoxal in a 1:1 mole ratio, the predominant reaction product is 4,5-dihydroxyimidazolidin-2-one (i.e., DHEU) represented by Formula (VIII):

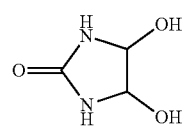
(VIII)

However, when excess urea increases the mole ratio of urea-to-glyoxal to 2:1, the predominant reaction product becomes a glycoluril compound shown in Formula (IX):

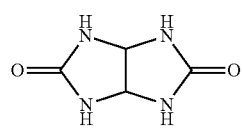
(IX)

Alternatively, when excess glyoxal shifts the mole ratio of urea-to-glyoxal to 1:2, the predominant reaction product becomes a (2R,3S,6R)-2,3,5,6-tetrahydroxy-1,4-diazabicyclo[2.2.1]heptan-7-one compound shown in Formula (X):

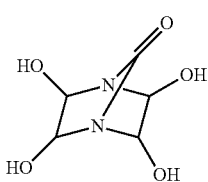
(X)

The reaction products of the urea compound and an aldehyde-containing compound having about a 1:1 mole ratio may include imidazolidine compounds of the Formula (XI):

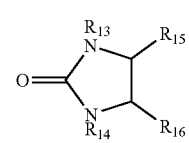
(XI)

where $R_{13}$, $R_{14}$, $R_{15}$, and $R_{18}$ are independently, —H, —OH, —NH$_2$, an alkyl group, an aromatic group, an alcohol group, an aldehyde group, a ketone group, a carboxylic acid group, and an alkoxy group. As noted above, when the reactants are urea and glyoxal, the reaction product may be 4,5-dihydroxyimidazolidin-2-one as shown in Formula (VIII).

Additional examples of reaction products of a urea compound with an aldehyde and/or ketone containing compound may include the reaction products of the above-described α,β-bicarbonyl compounds and α,γ-bicarbonyl compounds as represented by Formulas (XII)-(XVII) below:

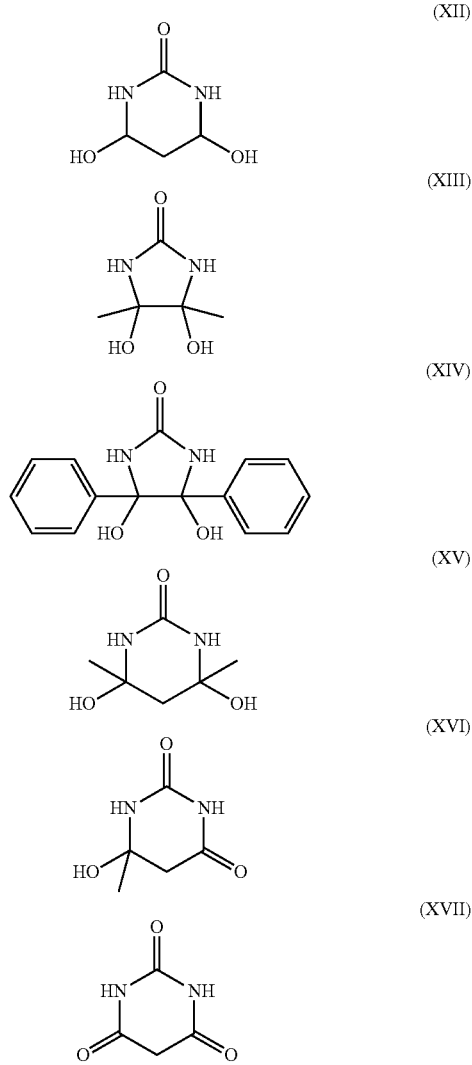

Exotherm Suppressant Binder Compositions

Embodiments of the exotherm suppressant compositions or binder compositions may include phenol-formaldehyde (PF), phenol-urea-formaldehyde (PUF), urea-formaldehyde (UF), melamine-formaldehyde (MF), polyester and combinations thereof, among others. The compositions may include thermoset or thermoplastic resins.

In embodiments, PF compositions may include resole compositions where the amount of formaldehyde (by mole) exceeds the amount of phenol. Phenol-to-formaldehyde mole ratios in these resole compositions range from 1:1 to 1:5 (e.g., 1:1.2 to 1:4.5; 1:1.5 to 1:2.5; etc.). In further embodiments, the PF compositions are aqueous compositions characterized by a total solids concentration greater than or about 30 wt. %, greater than or about 40 wt. %, greater than or about 50 wt. %, greater than or about 60 wt. %, or more.

In additional embodiments, the PF resole compositions may be made by combining phenol, formaldehyde, and a base that catalyzes the reaction between the phenol and formaldehyde reactants. In further embodiments, the phenol and formaldehyde may be combined as aqueous solutions in a reactor and heated to a temperature of 40-50° C. (e.g., 45° C.) under mechanically agitated (e.g., stirred) conditions. A base catalyst may be introduced to the aqueous phenol and formaldehyde mixture over a period of 10-30 minutes. In embodiments, the base catalyst may include one or more alkali metal hydroxides such as sodium hydroxide and potassium hydroxide, one or more alkaline earth metal hydroxides such as magnesium hydroxide and calcium hydroxide, one or more carbonate salts such as sodium carbonate and potassium carbonate, one or more ammonium salts such as ammonium hydroxide, and/or one or more amines, among other kinds of base catalysts.

In embodiments, the addition of the base catalyst raises the pH of the aqueous phenol and formaldehyde mixture above pH 7 (e.g., pH of 7-10), and can be accompanied by a further increase in reactor temperature (e.g., 70° C.) for 1-2 hours (e.g., 90 minutes). Following this reaction period, the PF reaction mixture may be cooled to room temperature (e.g., 23° C.) and neutralized (e.g., pH 7.2-7.6) by adding an acid (e.g., an inorganic acid such as sulfuric acid). In further embodiments, a cyclic urea compound and polyamine compound may be added directly to the PF reaction mixture to form the PF composition. In still further embodiments, the cyclic urea and polyamine compounds may function as a formaldehyde scavengers and crosslinking agents in the PF composition. In additional embodiments one or both of the compounds may also function as cure catalyst that obviate the need to add other cure catalysts to the binder composition. In some of these embodiments, the PF composition may include one or more pre-cured phenol-formaldehyde compounds, the cyclic urea and polyamine compounds, and any residual materials used in the making of the exotherm or binder composition (e.g., base catalyst, acidifier, etc.). In additional embodiments, a cure catalyst may be added in an amount less than or about 5 wt. %, less than or about 4 wt. %, less than or about 3 wt. %, less than or about 2 wt. % less than or about 1 wt. %, or less.

In additional embodiments, phenol-urea-formaldehyde (PUF) compositions may be made by taking a PF composition, either made in situ or purchased commercially, and adding urea. Exemplary preparation methods include adding an aqueous urea solution (or prilled urea) to the PF composition under agitation. In embodiments, the urea may be added in an amount greater than or about 15 wt. %, amount greater than or about 20 wt. %, greater than or about 30 wt. %, greater than or about 40 wt. %, greater than or about 50 wt. %, or more, based on the weight of the phenol-formaldehyde present in the composition. In additional embodiments, the urea may be added in an amount representing a mole ratio of the urea to free formaldehyde in the PF mixture ranging from 1:1 to 1:1.75.

In embodiments, at least one cyclic urea compound and polyamine compound may be added to the PF composition with the urea during the making of the PUF composition. In additional embodiments, at least one cyclic urea compound and polyamine compound may be added before or after the introduction of the urea.

In further embodiments, ammonia may accompany the addition of urea in the PUF compositions. Aqueous ammonia solutions may be added before, during, or after the addition of urea to the PF composition. The amount of added ammonia may be measured as a weight percentage of the PF present in the composition (e.g., 1 wt. % to 3 wt. % of the PF amount). The added ammonia alternatively be measured by the change in pH of the PF or PUF composition. For example, ammonia and urea may be added to a starting PF composition until its pH increases to around 8.5 (e.g., pH range of 8.2 to 8.6, pH of 8.3, etc.).

In some embodiments, the PUF compositions may also include a cure catalyst. The cure catalyst is normally added at 0.1% to 5% by dry weight (e.g., 1% to 3% by dry weight) of the composition. Exemplary cure catalysts include ammonium and amino salts such as ammonium sulfate, ammonium bisulfate, ammonium phosphate, ammonium sulfamate, ammonium carbonate, ammonium acetate, ammonium citrate and ammonium maleate.

In further embodiments, the urea-formaldehyde (UF) and melamine formaldehyde (MF) compositions may be made by combining formaldehyde and the urea or melamine reactants in an aqueous solution or mixture. In embodiments, the mole ratio of the urea or melamine to the formaldehyde may be greater than 1:1 in order to reduce the amount of free formaldehyde leftover after the binder has cured. In further embodiments, the mole ratio of urea or melamine to formaldehyde may be greater than or about 1:1, greater than or about 1.1:1, greater than or about 1.25:1, greater than or about 1.5:1, greater than or about 1.75:1, greater than or about 2:1, or more. In additional embodiments, the at least one cyclic urea compound and polyamine compound may be added to the UF or MF compositions with the urea or melamine during the making of the UF or MF compositions. In additional embodiments, at least one cyclic urea compounds and polyamine compound may be added before or after the introduction of the urea or melamine.

In embodiments, polyester binder, for example polycarboxylic acid/polyols such as polyacrylic acid/polyol can be prepared through the free radical polymerization of acrylic acid by the addition of an initiator followed by reaction with a polyol to generate a polyester thermoset. The at least one cyclic urea compound and polyamine compound may be added to the polyester compositions during or after the making of the polyester compositions.

In embodiments, the present exothermic suppressant binder compositions may also contain one of more of lubricants (e.g., a mineral oil), thickening and rheology control agents, dyes, and silane coupling agents (e.g., an amino alkyl alkoxysilane such as 3-aminopropyl triethoxysilane). When these processing aids are added to the composition, they are typically added at less than or about 5 wt. %, less than or about 4 wt. %, less than or about 3 wt. %, less than or about 2 wt. %, less than or about 1 wt. %, or less, based on the dry weight of the composition.

Unless otherwise indicated, the concentrations of the components of the exothermic suppressant binder compositions are a dry weight percentage that excludes the weight of a solvent. In some embodiments, the present exothermic suppressant binder compositions are aqueous, and the solvent is water. In some embodiments, the exothermic suppressant binder composition is a clear to translucent aqueous solution. The relative concentration of solids in the solvent (i.e. total solids) may range from about 5 wt. % to about 75 wt. % based on the total weight of the exothermic suppressant binder composition. More specific ranges of the total solids include about 5 wt. % to about 50 wt. %; about 10 wt. % to about 70 wt. %; about 10 wt. % to about 40 wt. %; about 30 to about 60 wt. %; about 40 to about 50 wt. %, among other ranges. Specific exemplary total solids concentrations based on the weight of the exothermic suppressant binder composition include about 10 wt. %, about 15 wt. %, about 20 wt. %, about 25 wt. %, about 30 wt. %, about 35 wt. %, about 40 wt. %, about 45 wt. %, about 50 wt. %, about 55 wt. %; about 60 wt. %; about 65 wt. %; about 70 wt. %; and about 75 wt. %, among other concentrations.

Exemplary Binders

In embodiments, the combination of a thermoplastic or a thermoset resin, for example at least one formaldehyde-containing compound, with a cyclic urea compound forms a binder with optionally a higher density of crosslinking and lower free formaldehyde emissions than formaldehyde-containing binder compositions that lack a cyclic urea compound and polyamine compound. In some embodiments, the compositions can also contain a polyamine compound such as melamine and dicyandiamide. In further embodiments, one or both of the cyclic urea compound and polyamine compound react with methylol groups in the formaldehyde-containing backbone polymers. Without being bound by theory, these reactions between the cyclic urea compounds (and/or polyamine compounds) and the methylol groups increase the crosslinking density in a cured binder while reducing the number of reversible reactions between pairs of methylol groups. Reducing the number of reversible methylol-methylol reactions reduces a source of free formaldehyde emissions when these ether-linked reaction products revert to methylene groups and free formaldehyde.

In embodiments, cured binders made according to embodiments of the present technology from at least one formaldehyde-containing compound, at least one cyclic urea compound, and at least one polyamine compound may have a higher crosslinking density than conventional cured binders made from the same formaldehyde-containing compound without the cyclic urea compound and polyamine compound. In further embodiments, the present cured binders may have an increased crosslinking density compared to a conventional cured binder without a cyclic urea compound and polyamine compound that is greater than or about 1%, greater than or about 2%, greater than or about 5%, greater than or about 7.5%, greater than or about 10%, greater than or about 12.5%, greater than or about 15%, greater than or about 17.5%, greater than or about 20%, greater than or about 22.5%, greater than or about 25%, or more.

In additional embodiments, cured binders made according to embodiments of the present technology from at least one formaldehyde-containing compound, at least one a cyclic urea compound, and at least one polyamine compound may have a lower amount of formaldehyde emissions than conventional cured binders made from the same formaldehyde-containing compound without the cyclic urea compound and polyamine compound at the same aging times and conditions. In still further embodiments, the presently disclosed cured binders may have formaldehyde emissions that are less than or about 95%, less than or about 90%, less than or about 85%, less than or about 80%, less than or about 75%, less than or about 70%, less than or about 65%, less than or about 60%, less than or about 55%, less than or about 50%, or less, at the same aging times and conditions, compared to conventional cured binders that lack a cyclic urea compound and polyamine compound. In some embodiments, the presently disclosed cured binders have formaldehyde emissions that are less than the limits of detectability.

Exemplary Fiberglass-Containing Products

Embodiments of the present disclosure also include fiberglass-containing products made with the present exotherm suppressant binder compositions. In embodiments, the fiberglass-containing products may include woven or non-woven glass fibers bound together by a matrix of the binder compositions. In additional embodiments, the fiberglass-containing products may include one or more additional types of fibers such as carbon fibers, mineral fibers, stone wool fibers, and organic polymer fibers, among other kinds of fibers. In embodiments, the fibers may make up about 50 wt. % to about 99.5 wt. % of the fiberglass-containing products. Additional exemplary fiber weight ranges include about 90 wt. % to about 99 wt. %; and about 75 wt. % to about 95 wt %. At the conclusion of the curing stage, in some embodiments, the cured binder may be a water-insoluble, thermoset binder present as a secure coating on the fiber mat at a concentration of approximately 0.5 to 50 percent by weight of the product, for example the cured binder may be present at concentration of approximately 1 to 10 percent by weight of the product. In other embodiments, the binder may be a water-insoluble, thermoplastic binder present as a secure coating on the fiber mat at a concentration of approximately 0.5 to 50 percent by weight of the product, for example the binder may be present at concentration of approximately 1 to 10 percent by weight of the product. Additional exemplary ranges of the cured binder (as a weight percentage of fiber-containing composite) may include at least about 1 wt. %; at least about 2 wt. %; at least about 3 wt. %; at least about 4 wt. %; at least about 5 wt. %; about 1 wt. % to about 25 wt. %; about 3 wt. % to about 25 wt. %; about 3 wt. % to about 15 wt. %; among other ranges. Specific exemplary amounts of the cured binder as a percentage weight of the fiberglass-containing product may include about 3 wt. %, about 5 wt. %, about 6 wt. %, about 7 wt. %, about 8 wt. %, about 9 wt. %, about 10 wt. %, about 11 wt. %, about 12 wt. %, about 13 wt. %; about 14 wt. %; about 15 wt. %; about 20 wt. %; and about 25 wt. %, among other amounts.

The fiberglass-containing products may take a variety of forms, for example construction materials including piping insulation, duct boards (e.g., air duct boards), and building insulation, reinforcement scrim, and roofing membranes, among other construction materials. Additional examples may include duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials.

The fibers and exotherm suppressant binder composition, along with the processing conditions, may be selected to produce fiber-containing composites with desired physical properties and aging characteristics. For example, when the fiberglass-containing product is a thermal insulation batt, the ordinary (i.e., unweathered) parting strength may be at least about 120 g/g (e.g., at least about 150 g/g). An exemplary range for the ordinary parting strength may be about 120 g/g to about 400 g/g. The weathered parting strength may also be at least about 120 g/g (e.g., at least about 150 g/g), where weathered parting strength is measured after fiberglass-containing product has been subjected to elevated temperature (e.g., about 120° F. or more) and humidity (e.g., about 95% or more relative humidity) for a period of time (e.g., about 7 days, about 14 days, etc.). An exemplary range for the weathered parting strength may be about 120 g/g to about 400 g/g.

Additional physical properties of the fiberglass-containing products may include a density that range of about 5 $kg/m^3$ to about 100 $kg/m^3$. More specific density ranges may include about 5 $kg/m^3$ to about 20 $kg/m^3$; and about 10 $kg/m^3$ to about 80 $kg/m^3$, among other density ranges. Specific exemplary densities of a the fiberglass-containing products may include about 5 $kg/m^3$; about 10 $kg/m^3$; about 15 $kg/m^3$; about 20 $kg/m^3$; about 25 $kg/m^3$; about 30 $kg/m^3$; about 35 $kg/m^3$; about 40 $kg/m^3$; about 45 $kg/m^3$; about 50 $kg/m^3$; about 55 $kg/m^3$; about 60 $kg/m^3$; about 65 $kg/m^3$; about 70 $kg/m^3$; about 75 $kg/m^3$; and about 80 $kg/m^3$, among other densities. Densities for the fiberglass-containing products may vary depending on the type of product made. For example, when the fiberglass-containing product is a thermal insulation batt, a density range of about 4 $kg/m^3$ to about 12 $kg/m^3$ is common, although not the only density range. When the fiberglass-containing product is duct board, a density range of about 30 $kg/m^3$ to about 100 $kg/m^3$ is more typical, although again not the only density range.

The fiberglass-containing products may have a thermal conductivity, A, of less than 0.05 W/mK. An exemplary range of the thermal conductivity for the fiberglass-containing products may include about 0.02 W/mK to about 0.05 W/mK.

Fiberglass-containing products that are thermal insulation batts may have an ordinary (i.e., unweathered or unaged) rigidity, as measured by droop level, of about 3 inches or less (e.g., 2.5 inches or less). They may have a weathered droop level of about 5 inches or less (e.g., about 3.5 inches or less). The composites may also have an ordinary recovery level after compression of about 6 inches or more (e.g., 6.5 inches or more). They may have a weathered recovery level of about 5 inches or more (e.g., about 6 inches or more). The droop levels and recovery level ranges may vary depending on the type of fiber-containing composite. For example, a fiberglass-containing product that is duct board may have an ordinary recovery level of about 0.9 inches to about 1.1 inches (although this is not the only range of thickness recovery for duct board).

The fiberglass-containing products may be made to limit the amount of volatile organic compounds (VOCs) emitted from the composites. Exemplary levels of VOC emissions from the fiber-containing composites may be about 1 lb/hour or less (e.g., about 0.8 lb/hour or less).

As noted above, the fibers in the fiberglass-containing products may make up about 50 wt. % to about 99.5 wt. % of the products, with most of the remaining weight being the binder. Because the binder will burn off the product when it is exposed to intense heat and flame, the loss of weight on ignition of the composite (LOI) may range from about 0.5 wt. % to about 50 wt. %. Additional LOI ranges may be from about 1 wt. % to about 10 wt. %; about 2 wt. % to about 10 wt. %; and about 3 wt. % to about 6 wt. %, among other LOI ranges. LOIs for the fiberglass-containing product may vary depending on the type of product made. For example, when the fiberglass-containing product is a thermal insulation batt, an exemplary LOI range may be about 1 wt. % to about 10 wt. % (although this is not the exclusive range). When the fiberglass-containing product is duct board, a typically LOI range may be about 15 wt. % to about 22 wt. % (although again this is not the exclusive range).

The fiberglass-containing products may be water-resistant. Exemplary levels of water absorption in the composites may be about 0.5 wt. % or less, based on the weight of the product (e.g., from 0.01 wt. % to 0.5 wt. %, from 0.1 wt. % to 0.5 wt. %). In other embodiments, the levels of water absorption in the composites may be about 0.5 wt. % to about 10 wt. %, based on the weight of the product (e.g., from 1 wt. % to 10 wt. %, from 2 wt. % to 8 wt. %, from 0.5 wt. % to 5 wt. %). The fiberglass-containing products may also generate reduced levels of particles during transport and installation. For example, when the fiberglass-containing product is thermal insulation batt, it may generate dust levels of about 10 grams to about 50 grams per 10,000 ft$^2$ of the composite. When the fiberglass-containing product is duct board, it may generate dust levels of about 0.03 grams to about 3 grams per pound of the duct board.

Figure 1B:
Figure 1C:
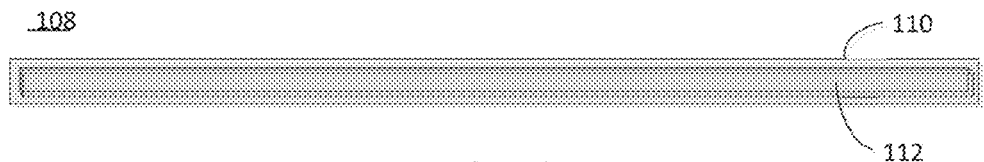

FIG. 1A-C illustrate some of these exemplary fiberglass-containing products. FIG. 1A is a simplified schematic of an exemplary fiberglass-containing batt material 102 that may be used for building, duct, pipe, or part insulation. The material 102 may include a batt 103 of non-woven fibers held together by the binder. The fibers include glass fibers that are used to make the fiberglass insulation (e.g., low-density or high-density fiberglass insulation), or a blend of two or more types of fibers, such as a blend of glass fibers and organic polymer fibers, among other types of fibers. In some examples, a facer 104 may be attached to one or more surfaces of the batt 103. Exemplary thicknesses of the batt 103 may range from about 1 cm to about 40 cm (e.g., about 2 cm to about 30 cm).

FIG. 1B is a simplified schematic of an exemplary fiberglass-containing composite board 106 that may be used as an insulation board, duct board, elevated temperature board, etc. The fibers in board 106 include glass fibers, and may also include one or more types of additional fibers such as organic polymer fibers, carbon fibers, mineral fibers, metal fibers, among other types of fibers, and blends of two or more types of these fibers.

FIG. 1C is a simplified schematic of an exemplary fiberglass-containing flexible insulation material 108 that may be used as a wrap and/or liner for ducts, pipes, tanks, equipment, etc. The fiberglass-containing flexible insulation material 108 may include a facer 110 attached to one or more surfaces of the fiber material 112. Exemplary materials for the facer 110 may include fire-resistant foil-scrim-kraft facing.

Specific examples of fiberglass-containing composites that use the presently disclosed exotherm suppressant binder compositions include thermal, thermoset insulation batts, such as low-density fiberglass insulation batt (e.g., less than about 0.5 lbs/ft$^3$) and high-density fiberglass insulation batt. Additional examples include piping insulation, duct boards, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation rolls, exterior foundation insulation board, and marine hull insulation.

Exemplary Systems for Making Fiberglass Products

Figure 2:
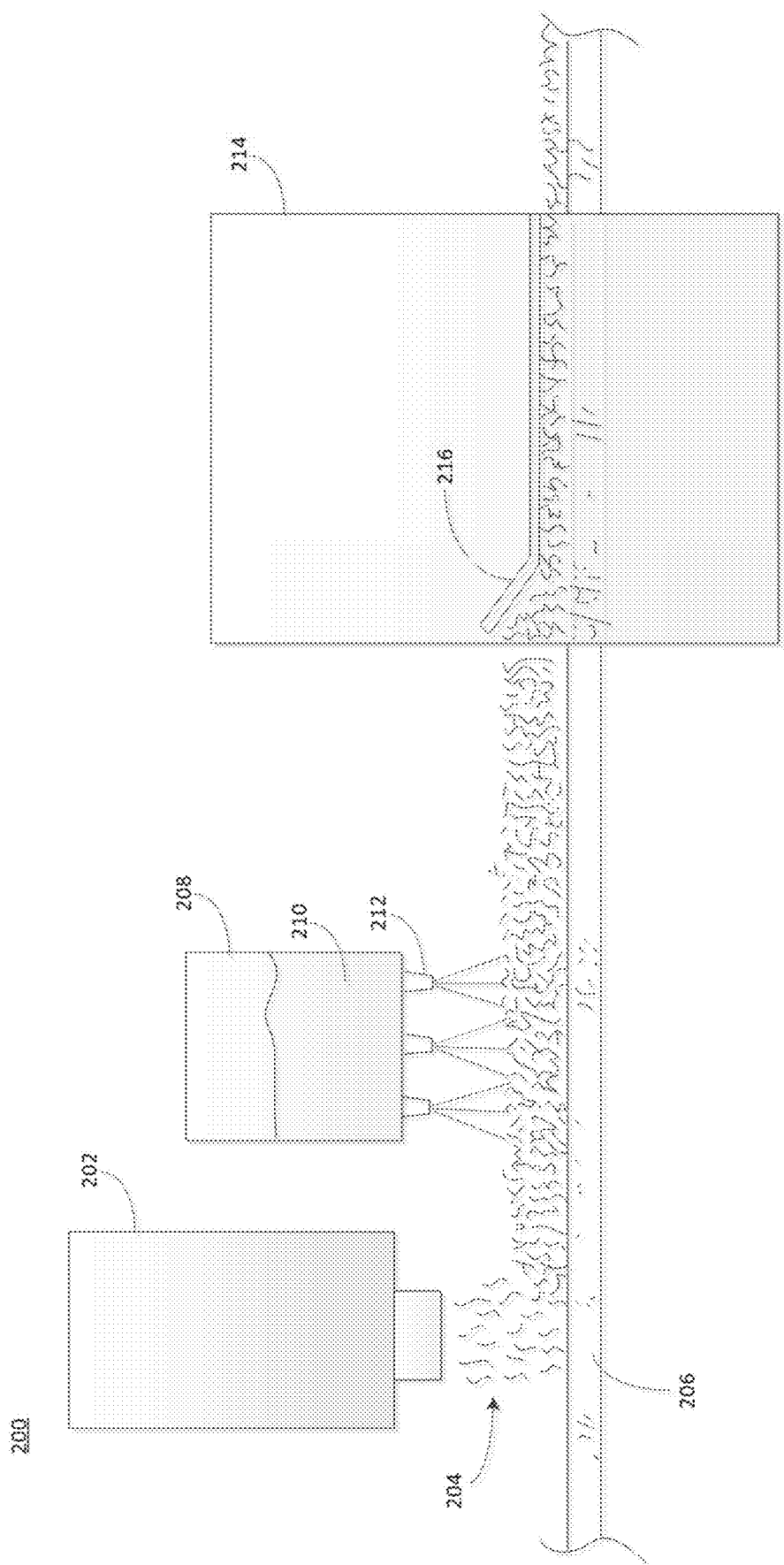
FIG. 2 shows a simplified schematic of an exemplary system for making fiberglass products according to embodiments of the present technology.

FIG. 2 shows a simplified schematic of an exemplary fabrication system 200 for making the fiberglass products described above. The system 200 includes fiber supply unit 202 that supplies the glass fibers for the product. The fiber supply unit 202 may be filled with pre-made glass fibers, or may include equipment for making the glass fibers from starting materials (e.g., molten glass). The fiber supply unit 202 deposits fibers 204 onto a porous conveyor belt 206 that transports the fibers under the binder supply unit 208.

The binder supply unit 208 contains a liquid uncured binder composition 210, that is deposited onto the fibers 204. In the embodiment shown, the binder composition 210 is spray-coated onto the fibers 204 with spray nozzles 212, however, other application techniques (e.g., curtain coating, dip coating, knife coating, etc.) may be used in addition to (or in lieu of) the spray coating technique illustrated by nozzles 212.

The binder composition 210 applied on fibers 204 forms a fiber and binder amalgam on the top surface of the conveyor belt 206. The belt 206 may be perforated and/or porous to allow excess binder composition 210 to pass through the belt 206 to a collection unit (not shown) below. The collection unit may include filters and circulation pumps to recycle at least a portion of the excess binder back to the binder supply unit 208.

The conveyor belt 206 transports the amalgam to an oven 214 where it is heated to a curing temperature and the binder composition starts to cure. The temperature of the oven 214 and the speed of the conveyor belt 206 can be adjusted to control the curing time and temperature of the amalgam. In some instances, process conditions may set to completely cure the amalgam into the fiberglass composite. In additional instances, process conditions may be set to partially cure the amalgam into a B-staged composite.

The amalgam may also be compressed prior to or during the curing stage. System 200 shows an amalgam being compressed by passing under a plate 216 that tapers downward to decrease the vertical space available to the curing amalgam. The amalgam emerges from under the plate 216 in a compressed state and has less thickness than when it first made contact with the plate. The taper angle formed between the plate 216 and conveyor belt 206 can be adjusted to adjust the level of compression placed on the amalgam. The partially or fully cured product that emerges from under plate 216 can be used for a variety of applications, including construction materials such as pipe, duct, and/or wall insulation, among other applications.

Exemplary Methods of Making Fiberglass Insulation Products

Figure 3:
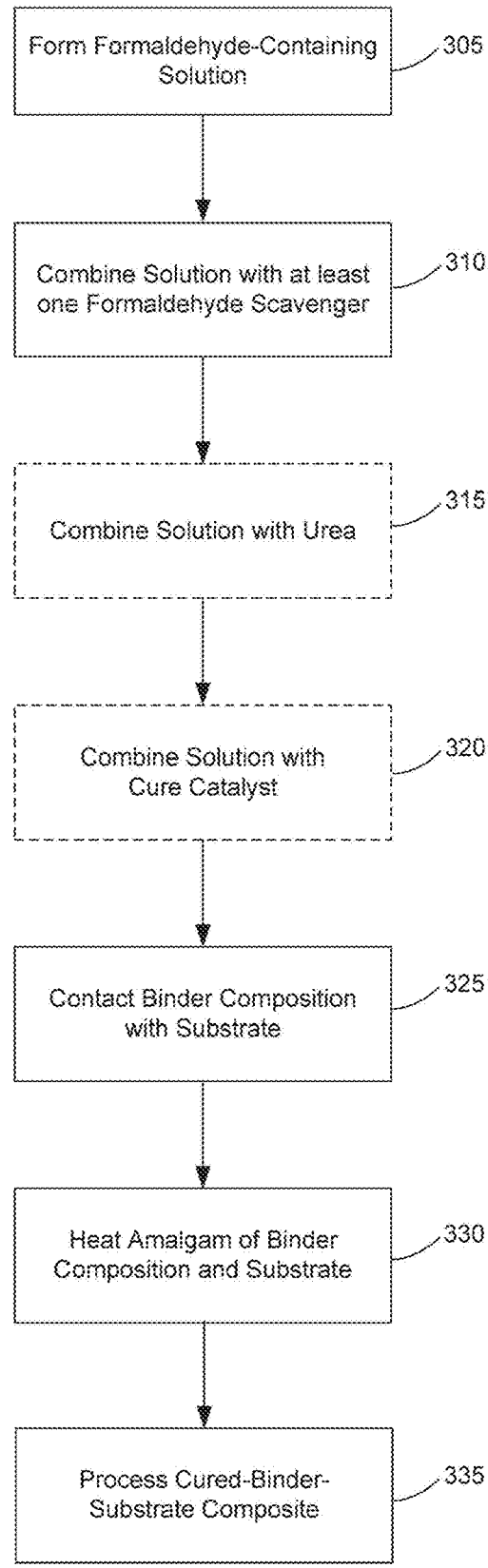
FIG. 3 is a flowchart that highlights some of the operations in a method of making a fiberglass product according to embodiments of the present technology.

FIG. 3 is a flowchart that highlights some of the operations in a method 300 of making a fiberglass product according to embodiments of the present technology. In embodiments, the method 300 may include forming a formaldehyde-containing solution (sometimes referred to as a raw resin) at operation 305. In further embodiments, the formaldehyde-containing starting solution may include formaldehyde combined with at least one compound selected from phenol, urea, and melamine. In still further embodiments, the formaldehyde-containing starting solution may be a phenol formaldehyde solution, a urea formaldehyde solution, a phenol-urea-formaldehyde solution, or a melamine formaldehyde solution. In yet additional embodiments, the formaldehyde-containing solution may be an aqueous solution with a total solids concentration of less than or about 60 wt. %, less than or about 55 wt. %, less than or about 50 wt. %, less than or about 45 wt. %, less than or about 40 wt. %, or less. In more embodiments, the formaldehyde-containing solution may include free formaldehyde in an amount less than or about 15 wt. %, less than or about 12.5 wt. %, less than or about 10 wt. %, less than or about 7.5 wt. %, less than or about 5 wt. %, or less.

In additional embodiments, method 300 may further include combining the formaldehyde-containing solution with at least one formaldehyde scavenger at operation 310. In embodiments, the formaldehyde scavenger may include at least one polyamine compound. In further embodiments, the polyamine compound may be at least one of dicyandiamide and melamine, among other polyamines. In further embodiments, the polyamine may be added at a weight percentage of the total solids in the binder composition that is less than or about 50 wt. %, less than or about 45 wt. %, less than or about 40 wt. %, less than or about 35 wt. %, less than or about 30 wt. %, less than or about 25 wt. %, less than or about 20 wt. %, less than or about 15 wt. %, less than or about 10 wt. %, less than or about 5 wt. %, or less. In more embodiments, the at least one formaldehyde scavenger may include at least one cyclic urea compound. In still more embodiments, the cyclic urea compound may be added at a weight percentage of the total solids in the binder composition that is less than or about 50 wt. %, less than or about 45 wt. %, less than or about 40 wt. %, less than or about 35 wt. %, less than or about 30 wt. %, less than or about 25 wt. %, less than or about 20 wt. %, less than or about 15 wt. %, less than or about 10 wt. %, less than or about 5 wt. %, or less.

In further embodiments, the at least one formaldehyde scavenger combined with the formaldehyde-containing solution at operation 310 may include at least one cyclic urea compound and at least one polyamine compound. In still further embodiments, the weight percentage ratio of the cyclic urea compounds to the polyamine compounds in the binder composition may be less than or about 75:25, less than or about 70:30, less than or about 65:35, less than or about 60:40, less than or about 55:45, less than or about 50:50, less than or about 45:55, less than or about 40:60, less than or about 35:65, less than or about 30:70, less than or about 25:75, or less. In embodiments, the weight percentage ratio of cyclic urea compounds to the polyamine compounds may depend on the type of formaldehyde-containing compounds are in the binder composition. In some embodiments of phenol-formaldehyde and phenol-urea-formaldehyde binder compositions characterized by higher cure temperatures (e.g., greater than or about 170° C.), a higher weight percentage of cyclic urea-formaldehyde to polyamine may be used to maintain a low cure temperature of the phenol-and-formaldehyde-containing binder composition. In additional embodiments of urea-formaldehyde binder compositions that are phenol free and characterized by lower cure temperatures (e.g., less than or about 130° C.), a higher weight percentage of polyamine to cyclic urea-formaldehyde may be used to maintain low levels of formaldehyde emissions from the curing UF binder composition and cured binder.

In further embodiments, method 300 may optionally include combining the formaldehyde-containing solution with urea at operation 315. In embodiments, the formaldehyde-containing solution may include phenol and formaldehyde, and the urea may be added to form a phenol-urea-formaldehyde (PUF) binder composition (also sometimes referred to as a PUF "pre-react"). In additional embodiments, the weight percentage ratio of phenol and formaldehyde relative to the added urea may be greater than or about 50:50, greater than or about 55:45, greater than or about 60:40, greater than or about 65:35, greater than or about 70:30, or more. In yet additional embodiments, the added urea may be premixed with the at least one formaldehyde scavenger in a combined operation 310 and 315. In other embodiments, the urea may be added before the at least one additional formaldehyde scavenger is added at operation 310. In still other embodiments, the urea may be added after the formaldehyde-containing solution is combined with the at least one formaldehyde scavenger at operation 310.

In yet further embodiments, method 300 may optionally include combining the formaldehyde-containing solution with a cure catalyst at operation 320. In embodiments, the cure catalyst may include an inorganic catalyst. In additional embodiments, the inorganic catalyst may include an inorganic ammonium-ion-containing catalyst. In still additional embodiments, the inorganic ammonium-ion-containing catalyst may be at least one of diammonium sulfate and diammonium phosphate. In further embodiments, the cure catalyst may be at a weight percentage of the total solids in the binder composition that is less than or about 5 wt. %, less than or about 4.5 wt. %, less than or about 4 wt. %, less than or about 3.5 wt. %, less than or about 3 wt. %, less than or about 2.5 wt. %, less than or about 2 wt. %, or less. In embodiments, the addition of a cure catalyst may depend on the cure temperature of the binder composition without a cure catalyst. In some embodiments, phenol-free urea-formaldehyde binder compositions may be characterized by low cure temperatures (e.g., less than or about 130° C.) and may be free of a cure catalyst. In additional embodiments, a phenol-containing formaldehyde binder composition such as PF and PUF may be characterized by higher cure temperatures (e.g., greater than or about 170° C.) and may include at least one cure catalyst.

In embodiments, the combination of the formaldehyde-containing solution with the at least one formaldehyde scavengers, optional urea, and optional cure catalyst, among other binder compounds, may form the formaldehyde-containing binder composition. In additional embodiments, the binder composition may be characterized by a pH greater than or about 8, greater than or about 8.25, greater than or about 8.5, greater than or about 8.75, greater than or about 9, greater than or about 9.25, greater than or about 9.5, or more. In some embodiments of the binder compositions, premature polymerization may occur if the pH gets too low before the binder has cured. In these embodiments, an alkaline compound may be added to increase the pH of the binder composition. In embodiments, the alkaline compound added to the binder composition may be an inorganic hydroxide compound. In further embodiments, the inorganic hydroxide compound may be ammonium hydroxide. In yet further embodiments, the ammonium concentration may be at a weight percentage of the total solids in the binder composition that is less than or about 30 wt. %, less than or about 25 wt. %, less than or about 20 wt. %, less than or about 15 wt. %, less than or about 10 wt. %, less than or about 5 wt. %, or less.

Method 300 may further include contacting the formaldehyde-containing binder composition with a substrate at operation 325. In embodiments, the formaldehyde-containing binder composition may contact the substrate by spraying, curtain coating, spin coating, or dip coating, among other contacting techniques. In further embodiments, the substrate may be a fiberglass batt, a fiberglass mat, cellulose fibers, or a pressed cellulose board, among other kinds of substrate.

Method 300 may still further include heating the amalgam of the binder composition and the substrate to cure the binder composition at operation 330. In embodiments, the amalgam may be heated to a curing temperature greater than or about 125° C., greater than or about 130° C., greater than or about 135° C., greater than or about 140° C., greater than or about 145° C., greater than or about 150° C., greater than or about 155° C., greater than or about 160° C., greater than or about 165° C., greater than or about 170° C., greater than or about 175° C., greater than or about 180° C., greater than or about 185° C., greater than or about 190° C., greater than or about 195° C., greater than or about 200° C., or more. In additional embodiments, the amalgam may be heated to a curing temperature that is greater than or about the binder composition's cure temperature.

In embodiments, the amalgam of the curing binder composition and the substrate may be held at the curing temperature for greater than or about 1 minute, greater than or about 2 minutes, greater than or about 3 minutes, greater than or about 4 minutes, greater than or about 5 minutes, greater than or about 6 minutes, greater than or about 7 minutes, greater than or about 8 minutes, greater than or about 9 minutes, greater than or about 10 minutes, or more. In further embodiments, the end of the curing time may produce a cured binder-substrate composite.

Method 300 may yet further include processing the cured binder-substrate composite at operation 335. In embodiments, the processing operation 330 may include compacting, cutting, or otherwise shaping the cured binder-substrate composite. In additional embodiments, the processing operation 330 may include applying a facer or other coating to the cured binder-substrate composite. In yet further embodiments, the processing operation 330 may include packaging the cured binder-substrate composite.

In embodiments, the final binder-substrate composite may be one or more of fiberglass insulation batts, mats, liners, wraps, and boards, among other articles. In additional embodiments, the final binder-substrate composite may be one or more of building insulation, pipe insulation, appliance insulation, HVAC insulation, office partitions, particle board, and fiber board, among other articles.

Figure 4:
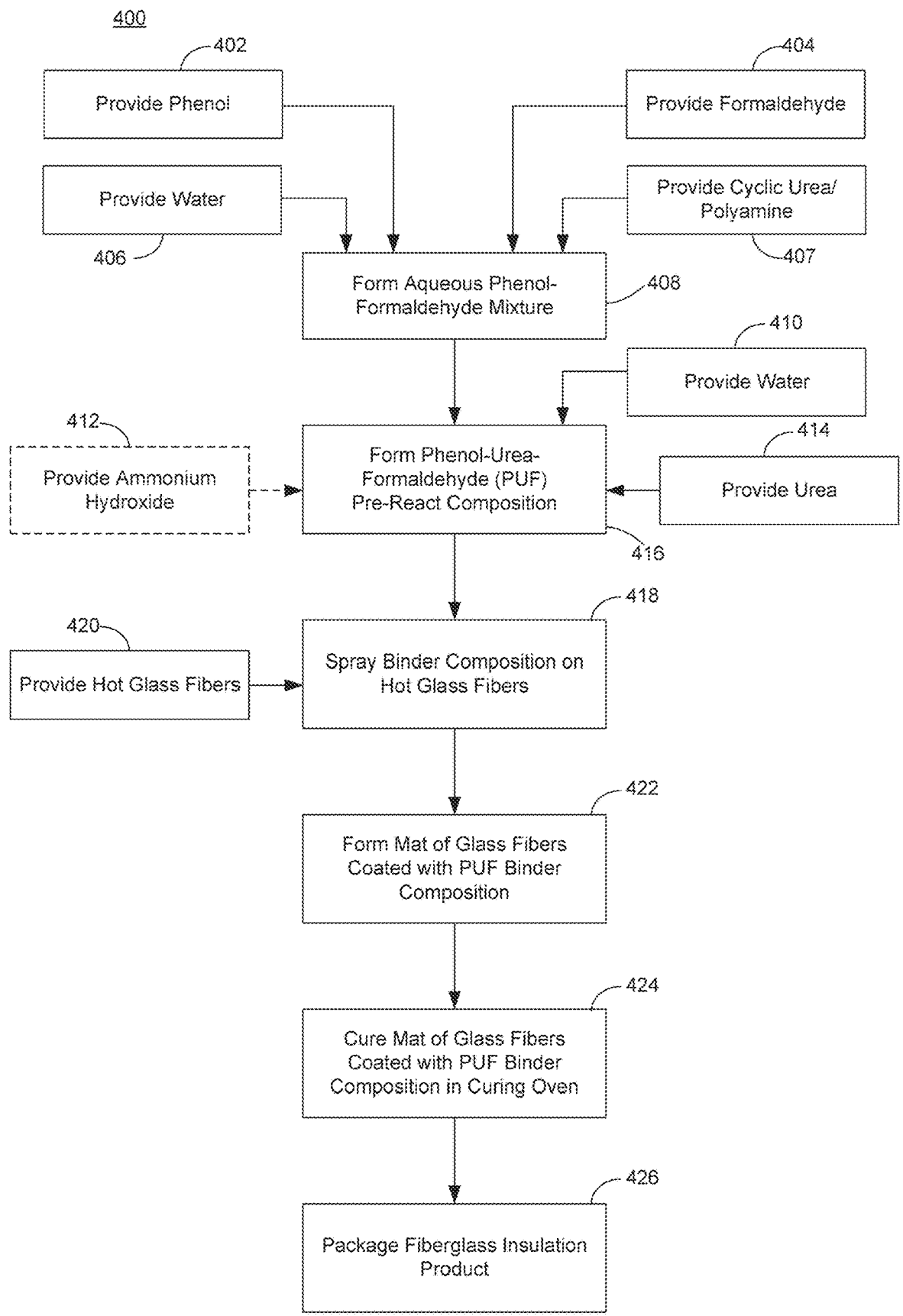
FIG. 4 is a flowchart showing selected components and operations in a method of making a fiberglass insulation product according to additional embodiments of the present technology.

FIG. 4 is a flowchart that highlights at least some of the operations in a method 400 of making a fiberglass product according to additional embodiments of the present technology. The method 400 starts by providing phenol 402, formaldehyde 404, and water 406 to form an aqueous phenol-formaldehyde mixture 408. A mixture of a cyclic urea compound and a polyamine compound 407 may also be added as part of the aqueous phenol-formaldehyde mixture. As noted above, the cyclic urea and polyamine compounds 407 may act as formaldehyde scavengers and crosslinkers in the binder composition and cured binder. In embodiments, the cyclic urea may include 4,5-dihydroxyimidazolidin-2-one, and the polyamine compound may include dicyandiamide or melamine.

The phenol and the formaldehyde may be provided such that they form the phenol-formaldehyde mixture with a formaldehyde-to-phenol molar ratio of about 1.2:1 to about 4.5:1 (e.g., a molar ratio range of 1.5:1 to 2.5:1). The relative quantities of the phenol, formaldehyde, water, and catalyst, may be combined to form the mixture with, for example, a total solids content of about 30 to 60 wt. % of the total weight of the mixture. Another exemplary range is a total solids content of 40 to 50 wt. %.

The phenol-formaldehyde mixture may be formed at an elevated temperature such as 60° C. to 90° C. The pH of the mixture becomes alkaline (e.g., pH ranging from 7 to 9) in those embodiments that include the cyclic urea and polyamine mixture 407 in the aqueous phenol-formaldehyde mixture. For example, when the cyclic urea catalyst is 4,5-dihydroxyimidazolidin-2-one, the pH of the phenol-formaldehyde mixture normally ranges from 7.5 to 8.5. The cyclic urea and polyamine mixture 407 may be added at 10 wt. % to 50 wt. % of the total solids in the aqueous phenol-formaldehyde mixture. The aqueous mixture may maintain this temperature for 1 minute to 10 hours before more components are added.

Once the mixture has homogenized, urea may be provided to it 410, and optionally ammonium hydroxide may also be provided 412, in addition to more water 414. These additional components transform the original phenol-formaldehyde mixture into a phenol-urea-formaldehyde (PUF) pre-react composition 416. The urea may be added in quantities that bring the weight percentage of the urea relative to the phenol-formaldehyde in the range of 15 wt. % to 50 wt. % (e.g., 20 wt % to 40 wt. %). Additional examples include a so-called "70/30" PUF pre-react composition that has about 70 wt. % phenol-formaldehyde and 30 wt. % urea based on the total weight of the phenol-formaldehyde and urea.

One or more cyclic urea compounds may be added with or after the urea that forms the PUF pre-react composition. In some embodiments, the cyclic urea and polyamine compounds are added to a PUF pre-react composition. The cyclic urea and polyamine compounds may be added in quantities that make up a significant weight percentage of the PUF pre-react composition on a total solids basis. Exemplary ranges for the amount of the cyclic urea and polyamine compounds in the PUF pre-react composition may include 10 wt. % to 50 wt. % of the total solids in the PUF pre-react composition. Additional exemplary minimum weight percentages may include 15 wt. %, 20 wt. %, 25 wt. %, 30 wt. %, 35 wt. %, 40 wt. %, and 45 wt. %, with the high end of the range at around 50 wt. % based on the total solids in the PUF pre-react composition.

The additional water may be provided to adjust the final concentration of the components of the PUF pre-react composition. Exemplary total solids range for the PUF pre-react composition includes 30 to 60 wt. %, 30 to 50 wt. %, and 40 to 50 wt. % of the total weight of the composition.

The pH of the starting phenol-formaldehyde mixture is maintained or slightly decreases with the addition of the urea, cyclic urea, and polyamine compounds to make the PUF pre-react composition. Exemplary pH ranges for the PUF pre-react composition include 7.0 to 9.0 (e.g., 7.5 to 8.5). These initial reactions may also be facilitated by heating the PUF pre-react composition above room temperature. An exemplary temperature range for the PUF pre-react composition includes about 40° C. to about 50° C. The PUF pre-react composition may react at ambient temperature (20-25° C.) or an elevated temperature range (e.g., 40-50° C.) for a period of time ranging from 1 to 12 hours. Additional exemplary time ranges include 2-6 hours, and 8-12 hours, among other ranges.

The PUF pre-react composition may be introduced to a binder table that is also being fed by water and any additional components of the final binder composition. Those additional components may include one or more of a mineral or organic oil to promote dust control of the glass fibers, additional catalysts, additional pH modifiers, coupling agents, such as silane coupling agents, that promote the adhesion of the binder to the glass fibers, thickeners and rheology control agents, coloring agents, and fire retardant agents, among other additional components. The water, PUF pre-react composition, and additional components may be combined under mixing conditions in the binder table to form the binder composition. A total solids concentration of the final binder composition may range from 1 wt. % to 25 wt. % based on the total weight of the binder composition. Additional exemplary ranges include 3 wt. % to 15 wt. %, 10 wt. % to 20 wt. %, and 12 wt. % to 15 wt. %.

The binder composition, which is made at least in part from the PUF pre-react composition, is sprayed on hot glass fibers 418. The hot glass fibers may be provided 320 by a rotating spinner disc that pushes molten glass through rows of tiny orifices in the disc's sidewalls to form the hot glass fibers. A series of nozzles circularly arranged around the hot fibers emerging from the spinner disc spray the binder composition onto the falling glass fibers before they settle on a moving conveyor belt to form a raw mat of fibers coated with the binder composition 422. The volume of binder composition passing through the spray nozzles may be set to produce a target level of binder in the fiberglass product. Exemplary binder levels in the fiberglass product may include 2 wt. % to 25 wt. % (e.g., 2 wt. % to 5 wt. %; 5 wt. % to 10 wt. %; and 15 wt. % to 25 wt. %) as measured by a standard Loss-On-Ignition (LOI) analysis. The heat of the glass fibers evaporates a portion of the water and other volatile compounds from the binder composition, as well as promote the further polymerization of the phenol-formaldehyde-urea compounds as well as crosslinking them with the one or more urea-dialdehyde and polyamine compounds. In some embodiments, air is blown through the conveyor belt and mat to promote the removal of the water and other volatile compounds from the mat.

The conveyor belt transports the raw mat of fibers and binder composition to a curing oven where the binder composition is more completely cured 424 and additional water and other volatile compounds are removed from the curing fiberglass insulation. The oven temperature may be set to heat the raw mat of fibers and binder composition to a peak curing temperature of about 200° C. (392° F.) to about 260° C. (500° F.). The mat may pass through the curing oven over a period of about 1 minute to 15 minutes. Additional oven curing times may range from about 1.5 minutes to about 2 minutes, and about 5 minutes to 10 minutes.

The cured fiberglass insulation mat emerging from the curing oven may be packaged into a fiberglass insulation product 426. Exemplary products include fiberglass insulation batts, mats, liners, wraps, and boards for a variety of purposes, including building insulation, pipe insulation, appliance insulation, HVAC insulation, and office partitions, among other purposes.

EXPERIMENTAL

To demonstrate the effectiveness of the described exotherm suppressants, aforementioned cyclic ureas were incorporated into the polymeric matrix of various thermosets, specifically formaldehyde-containing thermosets and polyester thermosets.

In one experiment, a thermogravimetric analysis ("TGA") of the compositions was carried out under air from ambient temperature to 500° C. In another experiment, the exotherm resistance of the compositions was evaluated by preparing glass fiber composites of 7 wt. % to 40 wt. % resin and placing the composites in an oven at a set temperature between 210° C. and 300° C. and comparing the exotherm temperature of composites with and without the described cyclic urea exotherm suppressants.

To evaluate applicability for pipe insulation applications, sections of pipe were placed in a cone calorimeter at 455° C. and exotherm resistance was evaluated based on the rise in the temperature of the pipe and the presence or absence of flames. Cone calorimetry was carried out according to ASTM E-1354 and time to ignite and time to flame out were measured in seconds ISO-1182. A non-combustibility test of the pipe insulation product was carried out according to ASTM E136 and flaming was measured in seconds with the most stringent requirement for commercial marine applications requiring less than 10 seconds of sustained flaming. Table 1 shows the results of the flaming test procedure per ISO1182 conducted on pipe section manufactured at standard production conditions:

TABLE 1

| | Flaming (seconds) |
|---|---|
| Pipe insulation produced with control polyester binder | 10 |
| Pipe insulation produced with polyester containing 10% DHEU | 3 |
| Pipe produced with polyester binder containing 20% DHEU | 0 |

Figure 8:
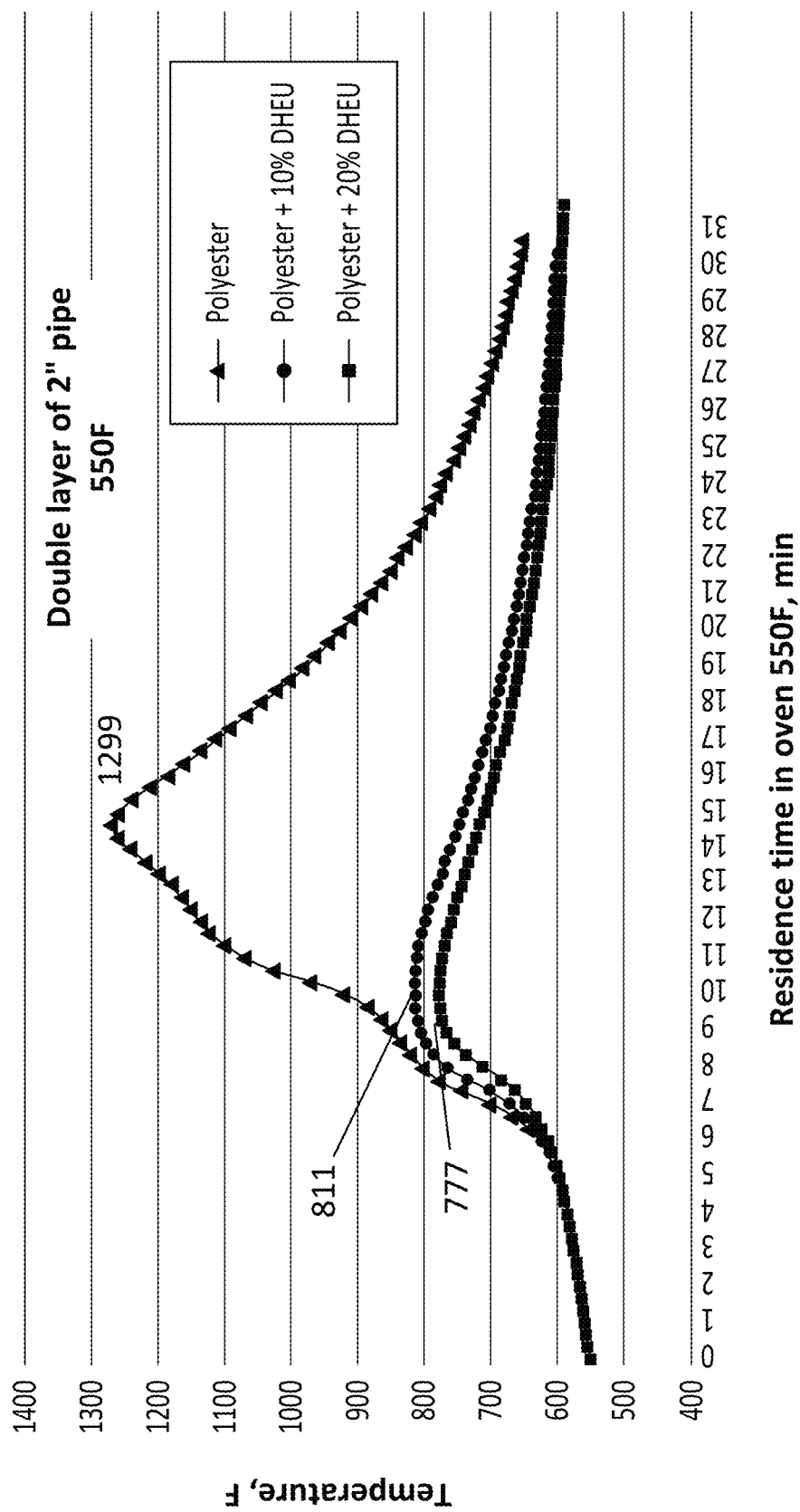
FIG. 8 shows the exotherm of polyester resins in pipe section.

The results of flaming test conducted on pipe sections produced at standard production conditions are in good correlation with results of exotherm test conducted on the same pipe sections as shown in FIG. 8.

Another aspect of the described binder composition is their cure profile. Cure kinetic evaluation was conducted using a dynamic mechanical analyzer (DMA). Table 2 shows a comparison of the peak cure temperature and the peak cure rate for standard phenolic resin with wt. % formaldehyde-based fire retardant, a polyester control resin and polyester resin with 10 wt. %, 20 wt. % and 30 wt. % DHEU. The inventive binder composition of polyester with cyclic urea shows significant reduction in the peak cure temperature compared to the standard phenolic resin with 16% formaldehyde-based fire retardant which can help to lower the curing oven temperatures providing energy and cost savings and reduced risk of fire hazards in the manufacturing plants.

TABLE 2

| Binder | Cure Temperature ° C. |
|---|---|
| PF binder with 16% formaldehyde-based fire retardant | 190 |
| Polyester control binder | 173 |
| Polyester binder with 10% DHEU | 179 |
| Polyester binder with 20% DHEU | 177 |
| Polyester binder with 30% DHEU | 172 |

Additionally, the mechanical performance of the inventive binder composition was evaluated by preparing dogbones with 2.5% LOI and testing for Tensile strength using an Instron Universal Testing Machine. Table 3 shows the tensile strength performance of dog bone substrates prepared with a polyester binder containing different levels of cyclic urea content and 2.5% LOI on finished specimen compared with standard phenolic binder with 16% formaldehyde-based fire retardant.

TABLE 3

| Binder | Tensile strength (MPa) |
|---|---|
| PF binder with 16% formaldehyde-based fire retardant | 3.4 |
| Polyester control binder | 4.3 |
| Polyester with 10% DHEU | 4.6 |
| Polyester with 20% DHEU | 5 |

In another series of experiments, a polycarboxylic acid was reacted with a polyol at 200° C. to generate a polyester thermoset. The TGA and exotherm behavior of the prepared thermoset was measured. Then different levels of 4,5-dihydroxyimidazolidin-2-one ("DHEU") were added to the polycarboxylic acid-polyol resin blend and cured at 200° C. The TGA and exotherm behavior of the prepared polyester thermoset containing DHEU were also determined.

Figure 5:
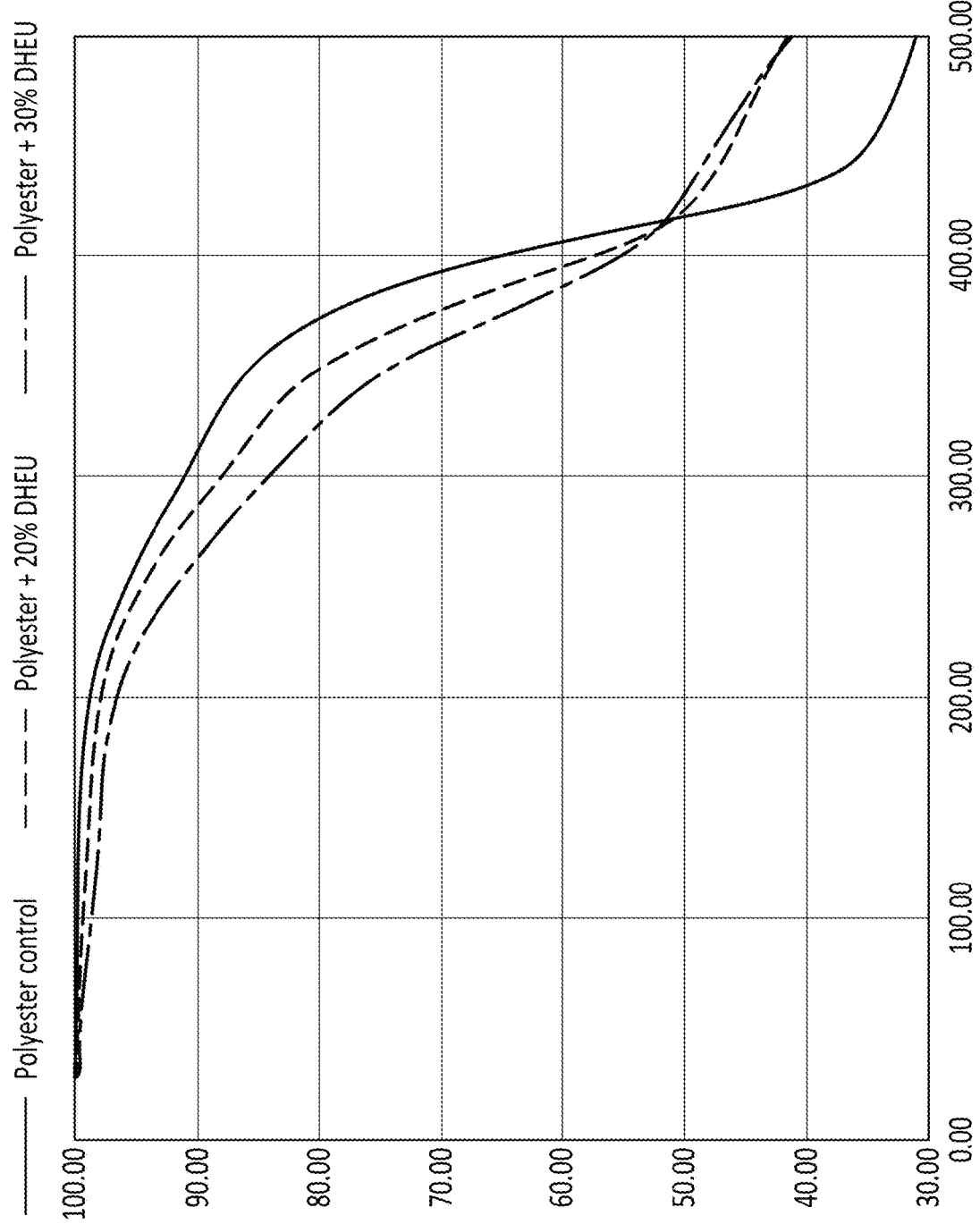
FIG. 5 shows the thermogravimetric analysis ("TGA") of polyester resins.

FIG. 5 shows the TGA of the polyester control (without DHEU) and with 20 wt. % and 30 wt. % DHEU. As can be seen from FIG. 5, the initial mass loss for polyester containing DHEU from 200° C. to 400° C. is higher than for the polyester control without DHEU. However, the rate of mass loss of the polyester control became much higher above 420° C. The gradual mass loss in the presence of the cyclic urea is a desirable phenomenon which results in a reduction in the concentration of combustible organic gases that can accumulate in the composite or insulation matrix, resulting in fire. Further, the retained mass of untreated polyester at 500° C. (32 wt. %) is considerably less than for the cyclic urea-treated polyester (42 wt. %), indicating a higher exotherm resistance obtained by the addition of cyclic urea.

Figure 6:
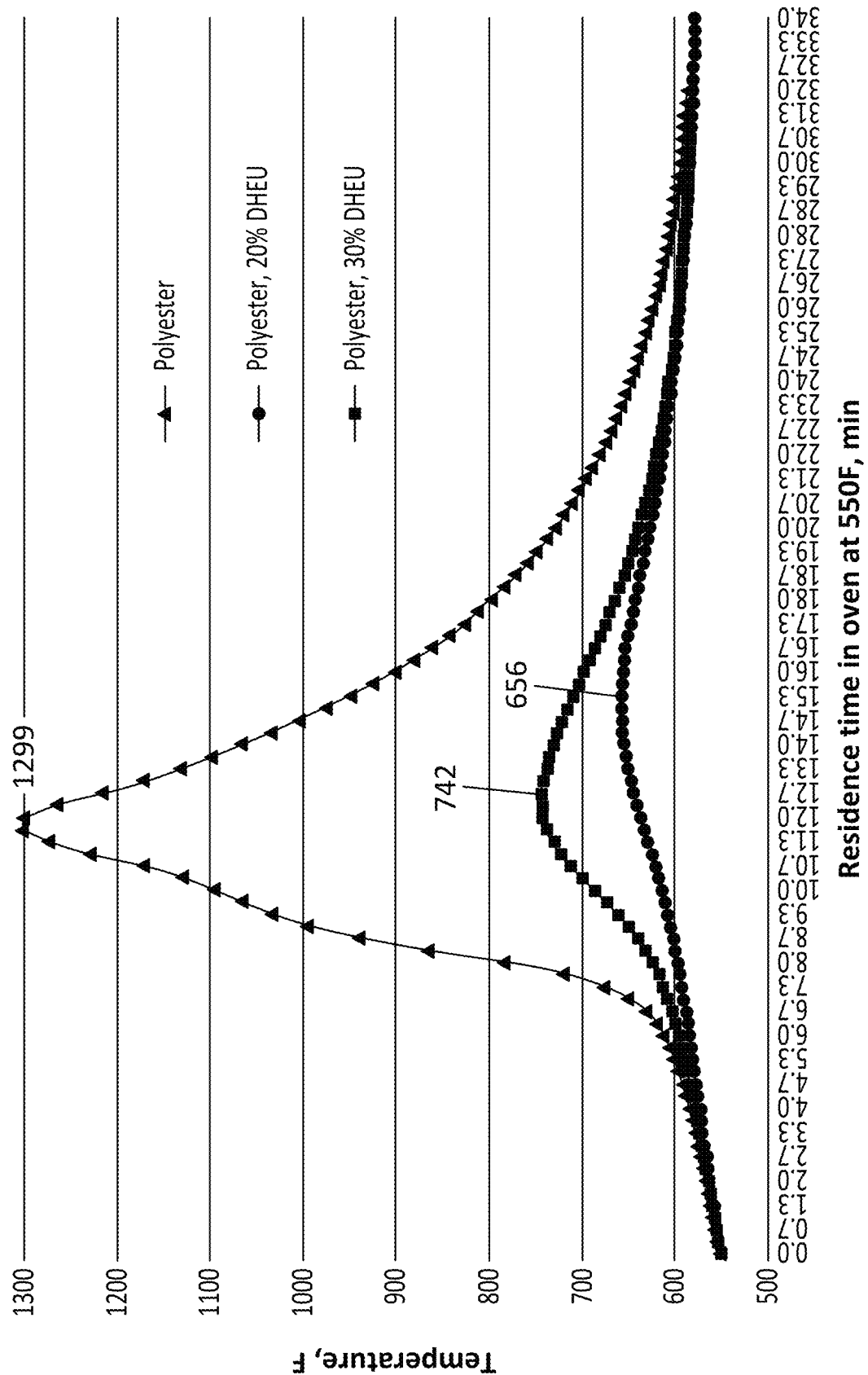
FIG. 6 shows the exotherm of polyester resins.

FIG. 6 shows the results of thermal exotherm testing conducted on glass-wad substrate prepared in laboratory conditions to mimic exotherm behavior of finished products such as pipe insulation or board products. A pristine glass substrate was impregnated with desired binder composition solution to generate a wad. The uncured binder wad was cured in the oven to mimic standard production conditions and product LOI (Loss-On-Ignition). A thermocouple was placed inside of a cured wad sample with 7% LOI. The cured binder wad was sandwiched between $R_{19}$ bats and subjected to a compression of 3.1 pounds-per-cubic-foot (pcf). The cured binder wad under compression was placed in hot oven of 550° F. to obtain exotherm profile. FIG. 6 shows the exotherms of the same polyester with no (0 wt. %) DHEU, with 20 wt. % DHEU and with 30 wt. % DHEU added. The exotherms show that the addition of the cyclic urea drastically reduces the heat generated from the composite when heated to 288° C. (550° F.). The exotherms graph in FIG. 6 shows that at the oven temperature of 550° F., the polyester composites undergo exothermic pyrolysis. At this temperature, the polyester (without cyclic urea) exotherms and reaches a maximum temperature of 1299° F. Under the same conditions, the polyester containing 20 wt. % DHEU and 30 wt. % DHEU gradually undergoes exothermic pyrolysis and reaches a temperature of only 656° F. and 742° F. respectively, indicating the exotherm suppressing effectiveness of the cyclic urea.

In a separate experiment, pyrolysis of DHEU indicated that it generates non-combustible gases $CO_2$ and water and a small amount of solid urazole. In additional experiments, pipe insulations sections made with standard phenolic resin containing 16 wt. % formaldehyde-based fire retardant were evaluated against pipe insulation made from polyester (without cyclic urea) and polyester containing 20 wt. % DHEU. Cone calorimetry was carried out using ASTM E-1354. The observed time to flame out for the phenolic, polyester, and polyester/DHEU were 86 seconds, 122 seconds, and 70 seconds, respectively. The data demonstrated the effectiveness of cyclic urea in suppressing exotherm and fire.

Figure 7:
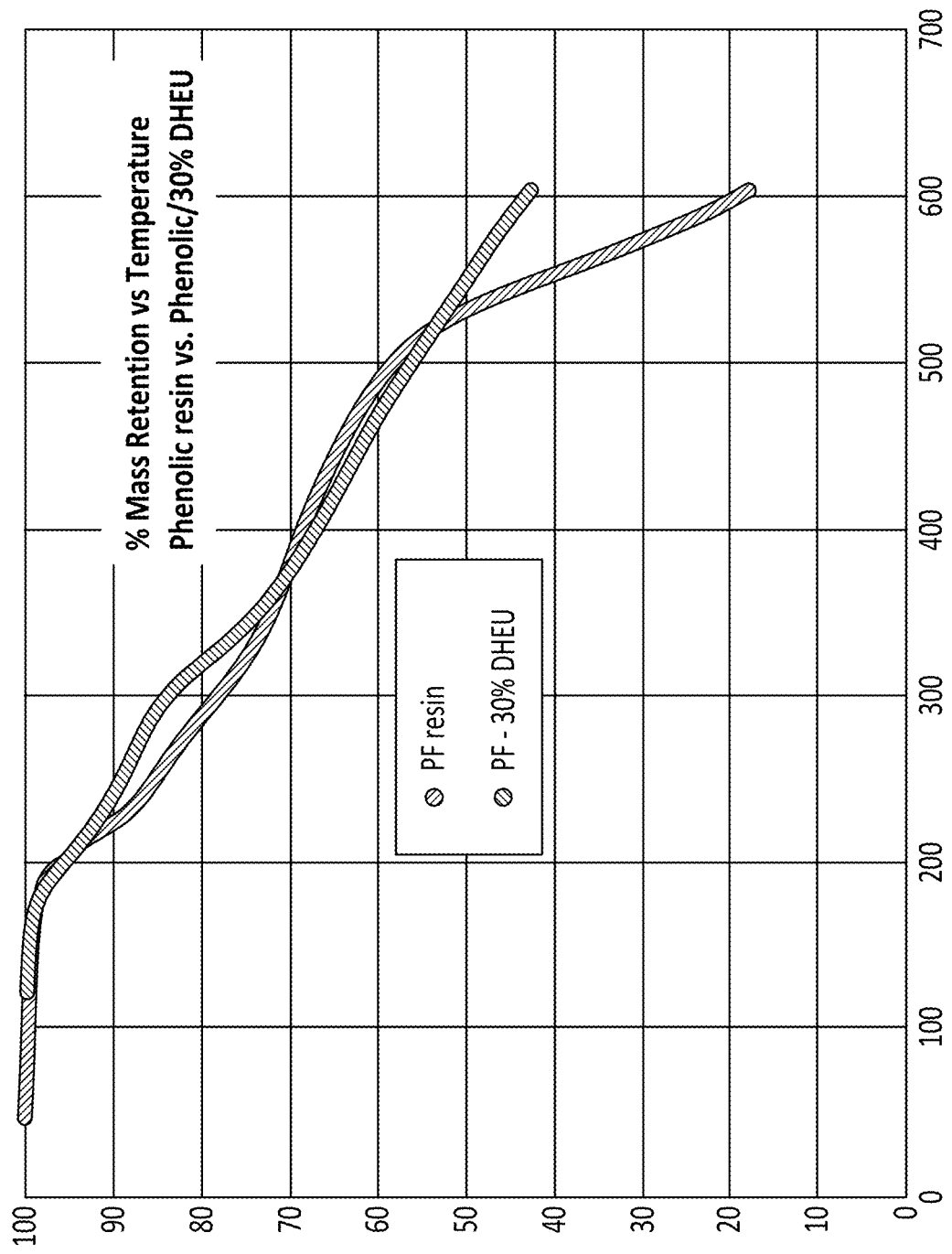
FIG. 7 shows the TGA mass retention for phenolic resins.

Further, the mass retention as a function of temperature as determined by TGA was measured for standard phenolic resin versus the same phenolic resin modified by the addition of 30 wt. % DHEU and plotted in FIG. 7. FIG. 7 shows less mass loss and a higher thermal stability for the phenolic resin modified with cyclic urea. The mass retention at 600° C. for the phenolic resin alone was 18 wt. % while the phenolic resin modified by cyclic urea had a mass retention of 43 wt. %.

In additional experiments, pipe insulation sections with 7% LOI and made with a polyester control, the same polyester with 10 wt. % DHEU and with 20 wt. % DHEU were evaluated for thermal stability based on an exotherm test. FIG. 8 shows the exotherm testing conducted on pipe section produced using standard production conditions. 2" wall pipe sections were stacked together to form a 4" wall pipe section. A thermocouple was inserted in the center of the assembled pipe section and the entire assembly was placed in an oven maintained at 550° F. to monitor the exothermic behavior of the polyester binder decomposition containing different levels of cyclic urea additive. The exotherm graph in FIG. 8 shows that at the oven temperature of 550° F., the polyester composite undergoes exothermic pyrolysis to reach a maximum temperature of 1266° F. Under the same conditions, the polyester containing 10 wt. % DHEU & 20 wt. % DHEU gradually undergoes exothermic pyrolysis and reaches a maximum temperature of only 811° F. and 776° F. respectively, indicating the exotherm suppressing effectiveness of the cyclic urea.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology. Additionally, methods or processes may be described as sequential or in steps, but it is to be understood that the operations may be performed concurrently, or in different orders than listed.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a compound" includes a plurality of such compounds, and reference to "the group of fibers" includes reference to one or more groups of fibers and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. An exotherm suppressant composition, comprising:
   a thermoset or thermoplastic resin polymeric matrix; and
   a cyclic urea compound in an amount from 1 wt. % to 50 wt. %, based on the weight of the exotherm suppressant composition, incorporated into the polymeric matrix of the thermoset or thermoplastic resin,
wherein the composition has no free formaldehyde, and
wherein the cyclic urea compound has the formula:

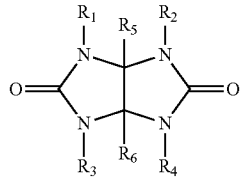

wherein $R_1$, $R_2$, $R_3$, and $R_4$ are independently selected from a hydrogen, a hydroxyl group, and an alcohol group, and
wherein $R_5$ and $R_6$ are independently selected from a hydroxyl group and an alcohol group.

2. The exotherm suppressant composition of claim 1, wherein the composition is halogen-free and antimony-free.

3. The exotherm suppressant composition of claim 1, further comprising at least one nitrogen or phosphorous containing compound.

4. The exotherm suppressant composition of claim 1, wherein the thermoset or thermoplastic resin is selected from the group consisting of epoxies, polyurethanes, acrylics, polyolefins, polyacrylics, polystyrenes, polyesters, and latex and dispersion polymers.

5. The exotherm suppressant composition of claim 1, wherein the thermoset or thermoplastic resin is selected from the group consisting of phenol formaldehyde, urea formaldehyde, phenol-urea-formaldehyde, melamine formaldehyde, melamine-urea-formaldehyde, resorcinol-formaldehyde, and polyesters.

6. The exotherm suppressant composition of claim 1, wherein the thermoset or thermoplastic resin is a polyacrylic acid/polyol resin.

7. The exotherm suppressant composition of claim 1, wherein the exotherm suppressant composition is water soluble and organic soluble.

8. The exotherm suppressant composition of claim 1, wherein the cyclic urea is present in an amount from 1 wt. % to 35 wt. %, based on the weight of the exotherm suppressant composition.

9. The exotherm suppressant composition of claim 1, wherein the cyclic urea is present in an amount from 15 wt. % to 35 wt. %, based on the total weight of the exotherm suppressant composition.

10. The exotherm suppressant composition of claim 1, wherein the mass retention of the exotherm suppressant composition at 600° C. measured using thermogravimetric analysis is 15% or greater, based on the total mass of the exotherm suppressant composition.

11. A fiberglass insulation composition, comprising:
glass fibers; and
a binder, wherein the binder comprises:
a thermoset or thermoplastic resin polymeric matrix; and
at least one cyclic urea compound in an amount from 1 wt. % to 50 wt. %, based on the weight of the binder, incorporated into the polymeric matrix of the thermoset or thermoplastic resin,
wherein the composition has no free formaldehyde, and
wherein the at least one cyclic urea compound has the formula:

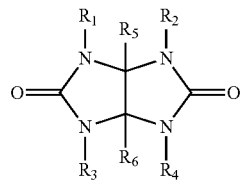

wherein $R_1$, $R_2$, $R_3$, and $R_4$ are independently selected from a hydrogen, a hydroxyl group and an alcohol group, and
wherein $R_5$ and $R_6$ are independently selected from a hydroxyl group and an alcohol group.

12. The fiberglass insulation composition of claim 11, wherein the time to flame out for the fiberglass insulation composition as measured by ASTM E-1354 is 80 seconds or less.

13. The fiberglass insulation composition of claim 11, wherein the thermoset or thermoplastic resin is selected from the group consisting of epoxies, polyurethanes, acrylics, polyolefins, polyacrylics, polystyrenes, polyesters, and latex and dispersion polymers.

14. The fiberglass insulation composition of claim 11, wherein the thermoset or thermoplastic resin is selected from the group consisting of phenol formaldehyde, urea formaldehyde, phenol-urea-formaldehyde, melamine formaldehyde, melamine-urea-formaldehyde, resorcinol-formaldehyde, and polyesters.

15. The fiberglass insulation composition of claim 11, wherein the thermoset or thermoplastic resin is a polyacrylic acid/polyol resin.

16. The fiberglass insulation composition of claim 11, wherein the binder is water soluble and organic soluble.

17. The fiberglass insulation composition of claim 11, wherein the cyclic urea is present in an amount from 1 wt. % to 35 wt. %, based on the weight of the binder.

18. The fiberglass insulation composition of claim 11, wherein the cyclic urea is present in an amount from 15 wt. % to 35 wt. %, based on the total weight of the binder.

19. A method of making a fiberglass insulation product, the method comprising:
forming a binder composition comprising:
a thermoset or thermoplastic resin polymeric matrix; and
at least one cyclic urea compound in an amount from 1 wt. % to 50 wt. %, based on the weight of the binder, incorporated into the polymeric matrix of the thermoset or thermoplastic resin;
contacting the binder composition with glass fibers to form an amalgam of the binder composition and glass fibers;
heating the amalgam of the binder composition and the glass fibers to form a mat of glass fibers and binder; and
processing the mat of glass fibers and binder into the fiberglass insulation product;
wherein the binder composition is formaldehyde free, and
wherein the at least one cyclic urea compound has the formula:

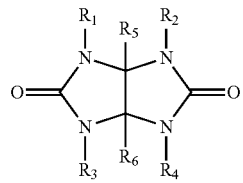

wherein $R_1$, $R_2$, $R_3$, and $R_4$ are independently selected from a hydrogen, a hydroxyl group and an alcohol group, and wherein $R_5$ and $R_6$ are independently selected from a hydroxyl group and an alcohol group.

20. The method of making a fiberglass insulation product of claim 19, wherein the cyclic urea is present in an amount from 15 wt. % to 35 wt. %, based on the total weight of the binder.

\* \* \* \* \*